(12) United States Patent
Stein

(10) Patent No.: US 6,375,350 B1
(45) Date of Patent: Apr. 23, 2002

(54) RANGE PYROMETER

(75) Inventor: Alexander Stein, Secaucus, NJ (US)

(73) Assignee: Quantum Logic Corp, Weston, CT (US)

( * ) Notice: Subject to any disclaimer, the term of this patent is extended or adjusted under 35 U.S.C. 154(b) by 67 days.

(21) Appl. No.: 09/634,440

(22) Filed: Aug. 8, 2000

(51) Int. Cl.$^7$ ................................................ G01J 5/00
(52) U.S. Cl. .................. 374/126; 374/128; 374/131; 374/141; 374/149; 250/353
(58) Field of Search ................ 374/121–126, 374/131, 128, 141, 149; 250/353, 49, 341.6, 339.14

(56) References Cited

U.S. PATENT DOCUMENTS

| | | | | |
|---|---|---|---|---|
| 4,351,996 A | * | 9/1982 | Kondo et al. ............... | 219/625 |
| 4,904,090 A | * | 2/1990 | Oliver .......................... | 236/94 |
| 5,326,172 A | * | 7/1994 | Ng ........................... | 250/338.1 |
| 5,326,173 A | * | 7/1994 | Evans et al. .............. | 250/341.7 |
| 5,448,038 A | * | 9/1995 | Kim ........................... | 219/441 |
| 5,690,429 A | * | 11/1997 | Ng .................................. | 374/1 |
| 6,149,298 A | * | 11/2000 | Kraus et al. ................. | 374/121 |
| 6,151,446 A | * | 11/2000 | Hunter et al. ............... | 118/725 |
| 6,160,242 A | * | 12/2000 | Guardado .................... | 118/724 |
| 6,179,465 B1 | * | 1/2001 | Yam ........................ | 250/252.1 |
| 6,179,466 B1 | * | 1/2001 | Peuse et al. ................ | 374/110 |
| 6,183,130 B1 | * | 2/2001 | Adams et al. ............... | 219/405 |
| 6,200,634 B1 | * | 3/2001 | Johnsgard et al. .......... | 118/666 |

* cited by examiner

Primary Examiner—Diego Gutierrez
Assistant Examiner—Yaritza Guadalupe

(57) ABSTRACT

Apparatus for measuring the temperature of an electrically heated pot which uses the Planck formula and employs an infrared reflective hemisphere; first and second infrared wave guides, and first and second infrared filters and infrared detectors as well as a calculating device.

6 Claims, 4 Drawing Sheets

Range Pyrometer

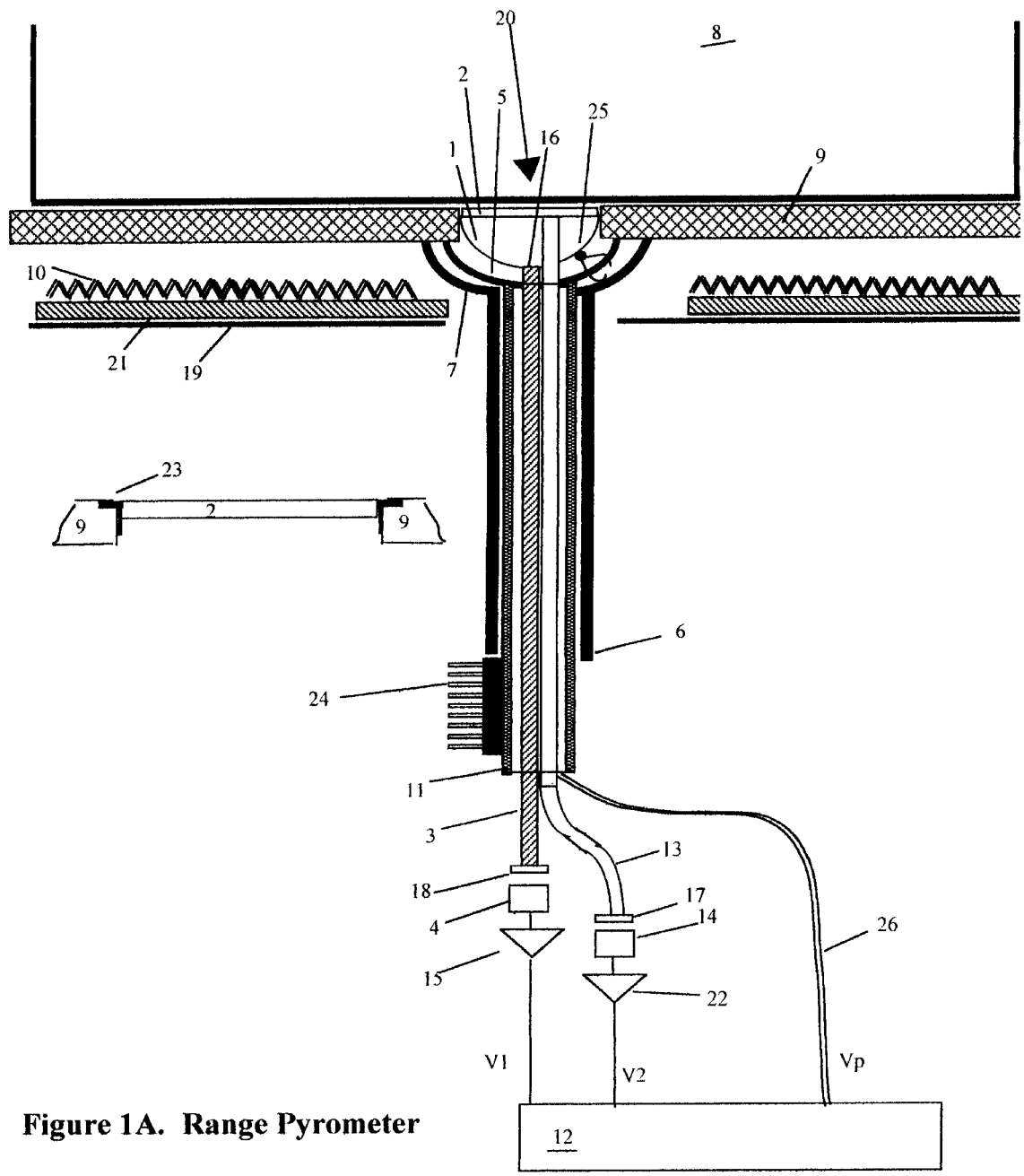
Figure 1A. Range Pyrometer

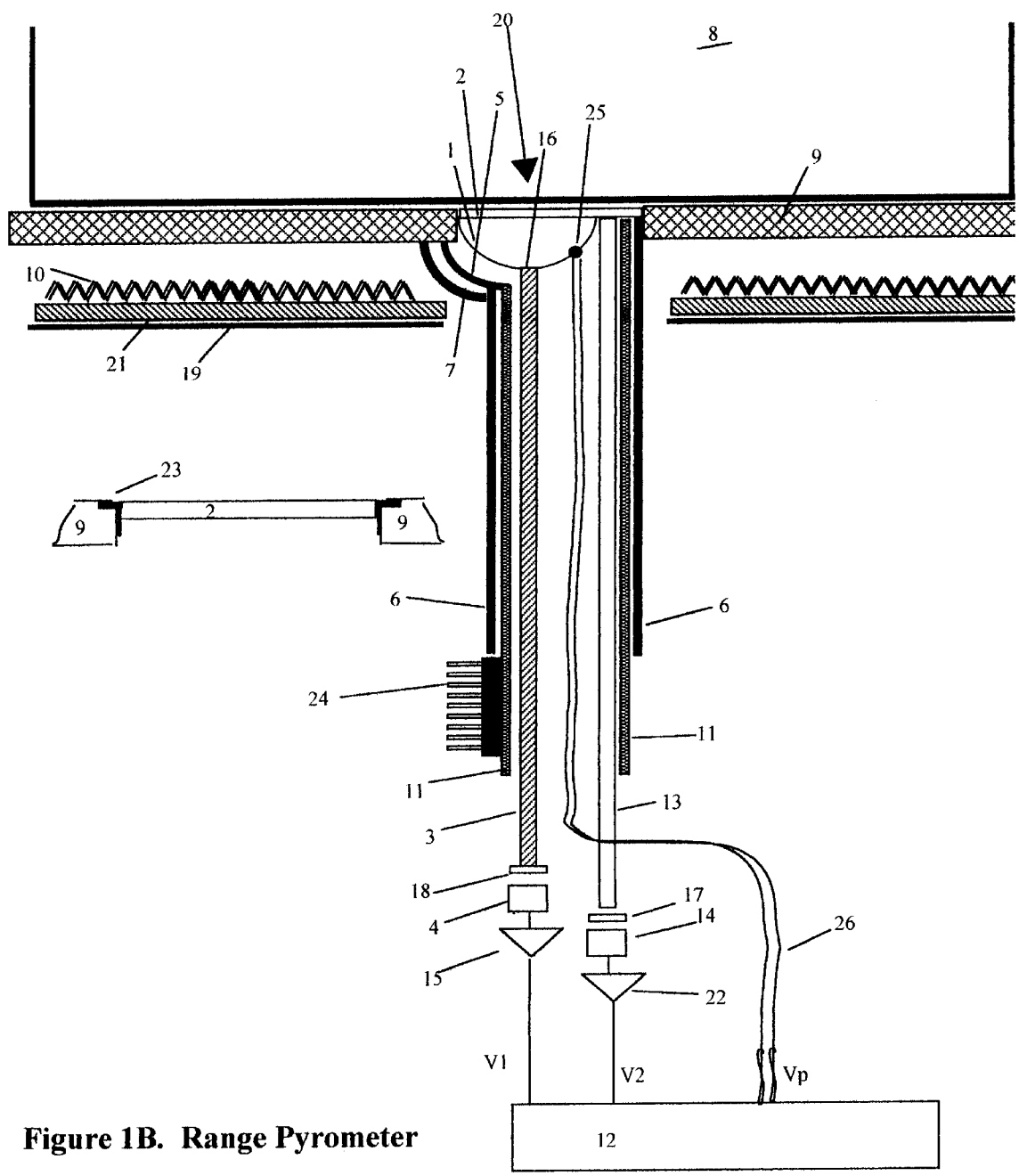
Figure 1B. Range Pyrometer

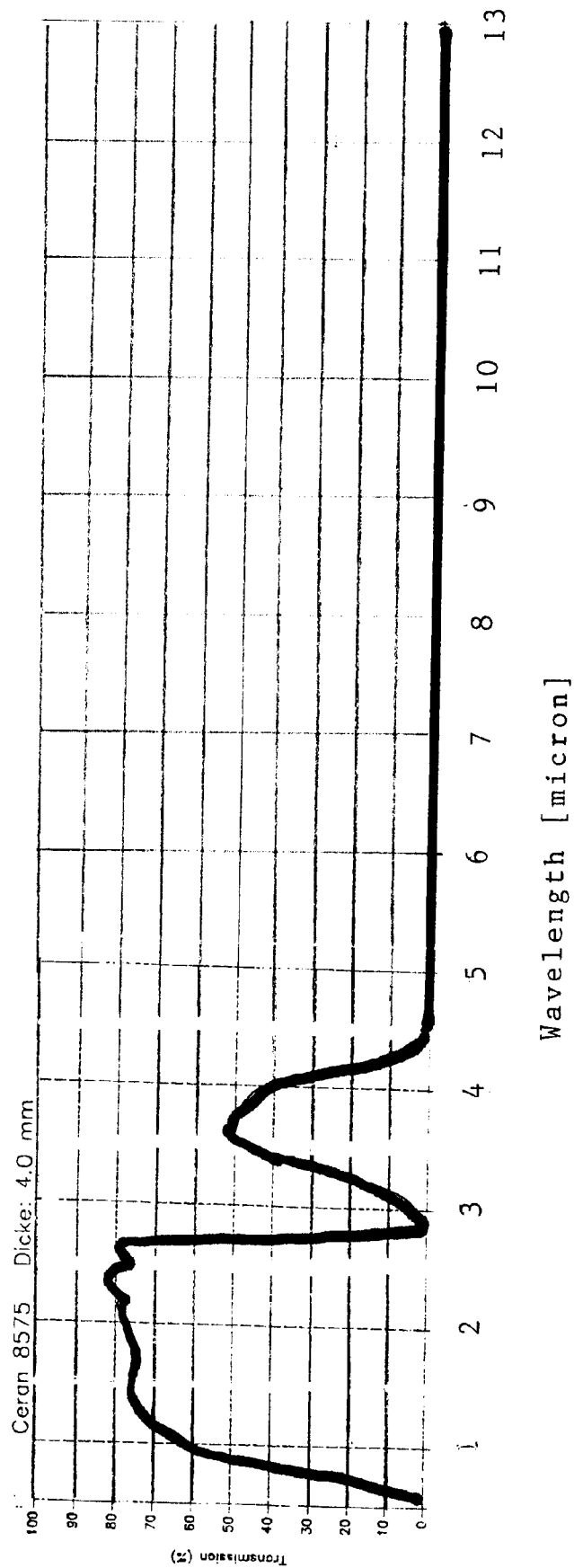
FIGURE 3    SPECTRAL TRANSMISSION OF CERAN

RANGE PYROMETER

BACKGROUND OF THE INVENTION

When a pot is heated on the top surface of a flat top electric heating range, it is often desirable to measure the temperature of the bottom surface of the heated pot. It is known that such heated surface emits infrared radiation. The present invention is directed toward apparatus for measuring such radiation and converting this measurement in to a corresponding temperature measurement.

The relationship between the temperature of a hot object as measured in degrees of temperature T, using the Kelvin temperature scale, and its spectral radiance L, when this relationship is measured using a wavelength of observation w, is defined by the well known Planck formula $L[w]=[E][C1][w^{-5}][\exp\{C2/wT\}-1^{-1}]$ where E is the spectral emissivity of the hot surface and C1 and C2 are constants. Consequently, in order to determine the temperature of a hot object from its direct infrared radiation, it is necessary to know its emissivity as well as its radiance.

The infrared radiation emitted directly by the heated pot usually does not approach that of a black body at the temperature of the pot and its emissivity value does not approach that of a black body and hence has an emissivity value much less than E=1. However, as explained in more detail hereinafter, the radiation emitted directly by the heated pot can be enhanced so that the effective emissivity of the enhanced radiation approaches that of a black body. Moreover, the ratio of the enhanced radiance to the direct radiance is a unique function of the physical emissivity of the pot. Thus, applicant had determined that using the value of the direct radiation of the pot and the emissivity of the pot as computed from this ratio, the temperature of the heated bottom surface of the pot could be computed using the Planck formula.

However, applicant discovered that the electric range itself produced sufficient radiation to interfere with any measurement of the direct and enhanced radiation of the pot. In addition, unless great care was employed in making radiation measurements, the measurement equipment would be heated and produce self emission, which of course produced further interference.

This invention is directed toward a new type of measuring apparatus for measuring the temperature of such a heated pot in such manner that the radiation from the range could not interfere with the desired measurement and further that the apparatus could not be heated to a level at which significant self emission was produced. Moreover, this apparatus provides a means for determining the emissivity of the heated pot. Consequently, an accurate measurement of the temperature could be obtained using the Planck formula.

SUMMARY OF THE INVENTION

Apparatus in accordance with the principles of this invention is directed toward determining the temperature of a heated pot disposed over an opening in a top flat surface of a cooking range. For this purpose, the bottom surface of the pot is larger than this opening and covers it.

The apparatus employs an infrared transparent window disposed in the opening abutting said surface so that the window is flush with said surface.

An infrared reflective hemisphere is disposed below the window. The hemisphere has an open top surface in direct contact with the window and a closed bottom surface with a small opening therein. As a result, a direct infrared radiation component from the bottom of the pot and a reflected infrared radiation component from the exposed surface of the hemisphere both pass freely through the window and the mixture of these two components is essentially combined within the cavity formed by the pot and hemisphere, enhancing the direct radiation from the pot so that the combined mixture approaches that of a black body at the temperature of the pot.

The apparatus employs a first infrared wave guide coupled to the small opening in the hemisphere to receive the enhanced radiance from the pot and a second wave guide butted against the window to receive the direct pot radiance.

The apparatus also employs first means disposed below said small hemisphere opening and coupled to said first and second guides for deriving from the guides the values of the direct radiance and the enhanced radiance; and second calculating means coupled to said first means. The second means has stored therein a program for determining the emissivity of the pot from the ratio of the enhanced radiance to the direct radiance, and incorporating the direct radiance value and the emissivity in the Planck formula to compute the temperature of the pot.

In order to prevent the radiation from the cooking range from interfering with the temperature measurement, applicant utilizes in the first means infrared radiation detectors which do not respond to the wavelengths of radiation from the range but respond only to a different and non-overlapping group of wavelengths whereby range radiation cannot interfere with temperature measurements. Moreover, the apparatus incorporates additional means to prevent it from being heated to such a level that self emission can interfere with the temperature measurements.

As a result, this invention overcomes the prior art difficulties in measuring the temperatures of heated pots employing flat top cooking ranges and for the first time enables accurate temperature measurements to be obtained.

BRIEF DESCRIPTION OF THE INVENTION

FIG. 1A is a cut away side view of a preferred embodiment of the invention.

FIG. 1B is a view similar to FIG. 1A but showing a modification thereof.

FIG. 3 is a graph displaying the spectral transmission of the range top plate made from CERAN as a function of wavelength in microns.

DETAILED DESCRIPTION OF PREFERRED EMBODIMENTS

Figure 2:
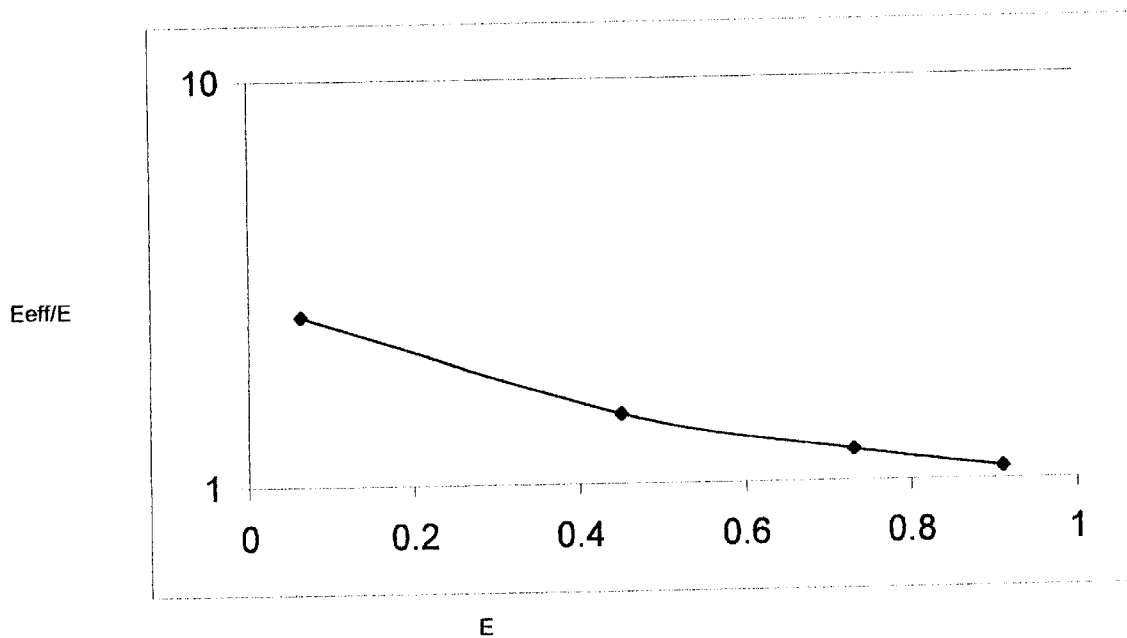
FIG. 2 is a graph displaying the ratio of enhanced to direct target radiation as a function of target emissivity.

Referring first to FIG. 1A, an electrical cooking range has a top plate 9 made of CERAN or similar material. The range has a metal frame 19 with thermal insulation disposed on its upper surface. The range heating coil 10 rests on the insulation. The plate has a small opening 20. A heated pot 8 has a bottom surface much larger than the opening. The pot rests on the top surface of the plate and covers the opening.

An infrared transparent window 2 is disposed in the opening flush with the top surface and is mechanically sealed thereto by a fitting ring 23. A concave shaped infrared reflecting hollow body such as an infrared reflecting hollow hemisphere 1 has an exposed surface with a mirror finish, typically a gold coating which is highly reflective in the infrared. The hemisphere has an open top end engaging the window and an opposite closed lower end having a small opening 16 therein.

The window 2, which typically is formed of zinc selenide, is disposed between the bottom of the pot and the open upper end of the hemisphere 1 to essentially protect the exposed surface of the concave body from contamination. At the same time, direct radiation from the bottom surface of the pot and reflected radiation from the exposed surface of the hemisphere pass freely through the plate essentially confining the mixture of the two radiation components within the cavity formed by the pot and the hemisphere. Consequently the direct radiation of the pot is enhanced and the combined radiation approaches that of a black body at the temperature of the pot.

A portion of the cavity radiation passes downward through small opening 16 in the bottom of the hemisphere. An infrared wave guide 3, typically a hollow gold coated tube, is connected at one end to the opening 16 and is coupled at its other end through an infrared filter 18 to an infrared detector 4 such as a thermopile sensor. Detector 4 converts the cavity radiation to an electrical signal which is amplified in amplifier 15 to produce signal V1. Signal V1 is proportional to the cavity radiance.

Infrared wave guide 13 has one end abutting plate 2 and is coupled at its opposite end through infrared filter 17 to an infrared detector such as a thermopile sensor 14. Detector 14 converts the direct radiation to an electrical signal which is amplified in amplifier 22 to produce signal V2. Signal V2 is proportional to the direct radiance. No reflected radiance is present in signal V2.

As shown in FIG. 3, the spectral transmission of CERAN or equivalent material is reduced to zero in the range of 4.5 to 13 microns. The filters 18 and 17 limit signals V1 and V2 to this zero range whereby the radiance from the range cannot influence the accuracy of the desired measurements.

In order to minimize heating of the hemisphere 1 and infrared wave guides 3 and 13, thereby minimizing self emission which could otherwise adversely influence the accuracy of the desired measurements, a ceramic shroud 7 of high infrared reflectance encloses the hemisphere and the upper end of guide 3. A metallic shroud 5, disposed within shroud 7, conducts heat to a thermally conductive tube 11 which in turn is connected to a beat sink 24. The tube 11 is surrounded by a heat insulating tube 6. The heat sink 24 is located in a relatively cool area away from the heating coils of the range. Thus this design provides for thermal insulation, radiation reflection and heat removable by conduction.

To provide additional protection of the reflective surfaces, the wave guide hemispherical reflector assembly may be sealed and filled with a chemically inert gas such as nitrogen or argon.

An ASIC chip 12 displays as an output the temperature in analog and digital form. This chip contains a look-up table having different values of emissivity E corresponding to different ratios of V1/V2. The chip contains algorithms which convert voltages V1 and V2 into digital numbers and then computes the ratio of these digital numbers, using the look-up table to obtain the corresponding value of the emissivity. The chip then inserts the values of V2 and E in the Planck formula to calculate the temperature.

In the event that, despite the cooling mechanisms described above, guides 3 and 13 and the hemisphere 1 are heated to a temperature at which they emit self radiance, and this radiation can change the values of signals V1 and V2, a correction can be made.

In order to correct these values, a thermocouple 25 measures the temperature of the hemisphere. A wire pair 26 connected to this thermocouple yields its output voltage Vp. A second and a third look-up table in the chip correct the values of V1 and V2, respectively, in accordance with the value of Vp. The temperature is then calculated as above.

The structure shown in FIG. 1B differs only from that shown in FIG. 1A in that the guide 13 in FIG. 1A passes through the hemisphere while the guide in FIG. 1B passes along but not through the hemisphere.

While the invention has been described with particular reference to the detailed description and the drawings, the protection sought is to be limited only by the terms of the claims which follow.

What is claimed is:

1. Apparatus for determining the temperature of a heated pot disposed over the opening in a top flat surface of a cooking range, a range top flat surface material having zero spectral transmission in the wavelength range of 4.5 to 13 microns, the bottom surface of the pot being larger than this opening and covering it, said apparatus comprising:

an infrared transparent window disposed in the opening and joined to said surface, the window being flush with said surface;

an infrared reflective hemisphere disposed below the window, the hemisphere having an open top end in direct contact with the window and a closed bottom end with a small opening therein, whereby a direct infrared radiation component from the bottom of the pot and a reflected infrared radiation component from the open top end of the hemisphere pass freely through the window and the mixture of these two components is essentially combined within the cavity formed by the pot and hemisphere, enhancing the direct radiation from the pot so that the combined mixture approaches that of a black body at the temperature of the pot;

a first infrared wave guide coupled at its upper end to the small opening in the hemisphere and receiving the enhanced radiance from the pot;

a second wave guide butted at an upper end and against the window to receive the direct pot radiance;

first means disposed below said small hemisphere opening and coupled to said first and second wave guides for deriving from the radiance received by the wave guides the values of the direct radiance and the enhanced radiance, said first means utilizing infrared radiation detectors which respond only to wavelengths in the range 4.5 to 13 microns; and second calculating means coupled to said first means, said second means having stored therein the Planck formula and responsive to said values yielded by said first means and to said formula to calculate the temperature of the heated bottom surface of the pot.

2. Apparatus for determining the temperature of a heated pot disposed over the opening in a top flat surface of a cooking range, the range top flat surface material having a zero spectral transmission in the wavelength range of 4.5 to 13 microns, the bottom surface of the pot being larger than this opening and covering it, said apparatus comprising:

an infrared transparent window disposed in the opening and joined to said surface, the window being flush with said surface;

an infrared reflective hemisphere disposed below the window, the hemisphere having an open top end in direct contact with the window and a closed bottom end with a small opening therein, whereby a direct infrared radiation component from the bottom of the pot and a reflected infrared radiation component from the open top end of the hemisphere pass freely through the window and the mixture of these two components is essentially combined within the cavity formed by the pot and hemisphere, enhancing the direct radiation from the pot so that the combined mixture approaches that of a black body at the temperature of the pot;

a first infrared wave guide coupled at an upper end to the small opening in the hemisphere to receive the enhanced radiance from the pot;

first means coupled to the lower end of the first guide and including a first infrared filter passing wavelengths in the range 4.5 to 13 microns and a first infrared detector responding to said passed wavelengths to produce a first electrical signal V1 proportional to the cavity radiance;

a second wave guide butted at its upper end against the window to receive the direct pot radiance;

second means coupled to the lower end of the second guide and including a second like infrared filter and a second like infrared detector to produce a second electrical signal V2 proportional to the direct radiance;

third calculating means coupled to said first and second means and responsive to signals V1 and V2 to convert same to digital numbers and then compute the ratio of these numbers, said third means containing a look-up table for converting said ratio into a corresponding value of emissivity, said third means inserting said numbers and said emissivity value in the Planck formula to compute the desired temperature value.

3. Apparatus as set forth in claim 2 wherein said third means includes an ASIC chip.

4. Apparatus as set forth in claim 3 wherein a ceramic shroud of high infrared reflectance encloses the hemisphere and the upper end of the first wave guide.

5. Apparatus as set forth in claim 4 wherein a metallic shroud is disposed within the ceramic shroud, the apparatus including a heat sink and a thermally conductive tube, said metallic shroud conducting heat through said tube to said sink.

6. Apparatus as set forth in claim 5 further including a heat insulating tube surrounding the thermally conductive tube.

* * * * *